United States Patent
Yunoki et al.

(10) Patent No.: US 9,874,869 B2
(45) Date of Patent: Jan. 23, 2018

(54) INFORMATION CONTROLLER, INFORMATION CONTROL SYSTEM, AND INFORMATION CONTROL METHOD

(71) Applicant: Hitachi, Ltd., Tokyo (JP)

(72) Inventors: Shoji Yunoki, Tokyo (JP); Tsutomu Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 14/777,609

(22) PCT Filed: Mar. 29, 2013

(86) PCT No.: PCT/JP2013/059448
§ 371 (c)(1),
(2) Date: Sep. 16, 2015

(87) PCT Pub. No.: WO2014/155650
PCT Pub. Date: Oct. 2, 2014

(65) Prior Publication Data
US 2016/0085237 A1  Mar. 24, 2016

(51) Int. Cl.
*H04L 29/06* (2006.01)
*G06F 21/00* (2013.01)
*G05B 23/02* (2006.01)
*H04L 29/14* (2006.01)

(52) U.S. Cl.
CPC .......... *G05B 23/0235* (2013.01); *H04L 29/14* (2013.01); *H04L 63/1425* (2013.01)

(58) Field of Classification Search
CPC .. G05B 23/0235; H04L 63/1425; H04L 29/14
See application file for complete search history.

(56) References Cited

U.S. PATENT DOCUMENTS

2008/0177901 A1    7/2008  Watanabe et al.
2010/0111231 A1*   5/2010  Koorapaty ............ H04L 5/0048
                                                    375/340

FOREIGN PATENT DOCUMENTS

| JP | 2014-312176 A | 11/2004 |
| JP | 2008181299 A  | 8/2008  |
| JP | 2012084994 A  | 4/2012  |

OTHER PUBLICATIONS

Translation of Japanese Office Action received in corresponding Japanese Application No. 2015-507857 dated Aug. 25, 2015.
International Search Report for International Application No. PCT/JP2013/059448 dated Jun. 4, 2013.

* cited by examiner

*Primary Examiner* — Lisa Lewis
(74) *Attorney, Agent, or Firm* — Mattingly & Malur, PC

(57) ABSTRACT

The present invention detects abnormality in a control network in which a normal pattern of communication changes in accordance with the state of a control system. A normal pattern of communication between devices is stored for each state, information indicating the system state is acquired to determine the system state, and information indicating the pattern of communication between devices is acquired to determine the pattern of communication. Then, by determining, on the basis of the determined pattern of communication and the pattern of communication stored as a normal pattern of communication in the determined system state, whether system abnormality has occurred, it is possible to enhance the availability and reliability of the control network.

10 Claims, 18 Drawing Sheets

F I G. 1
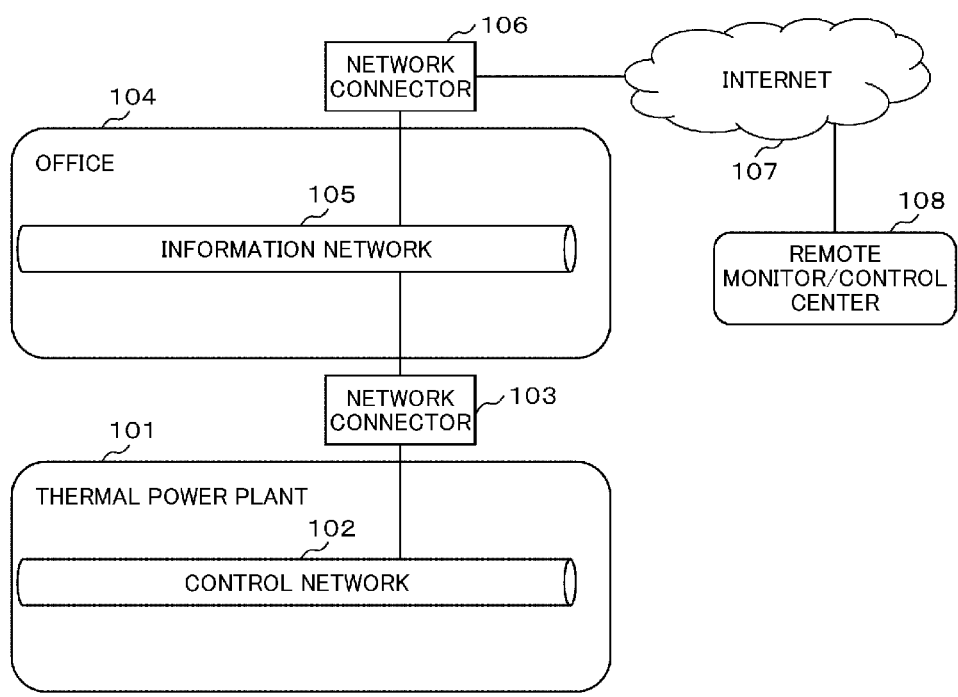

F I G. 4
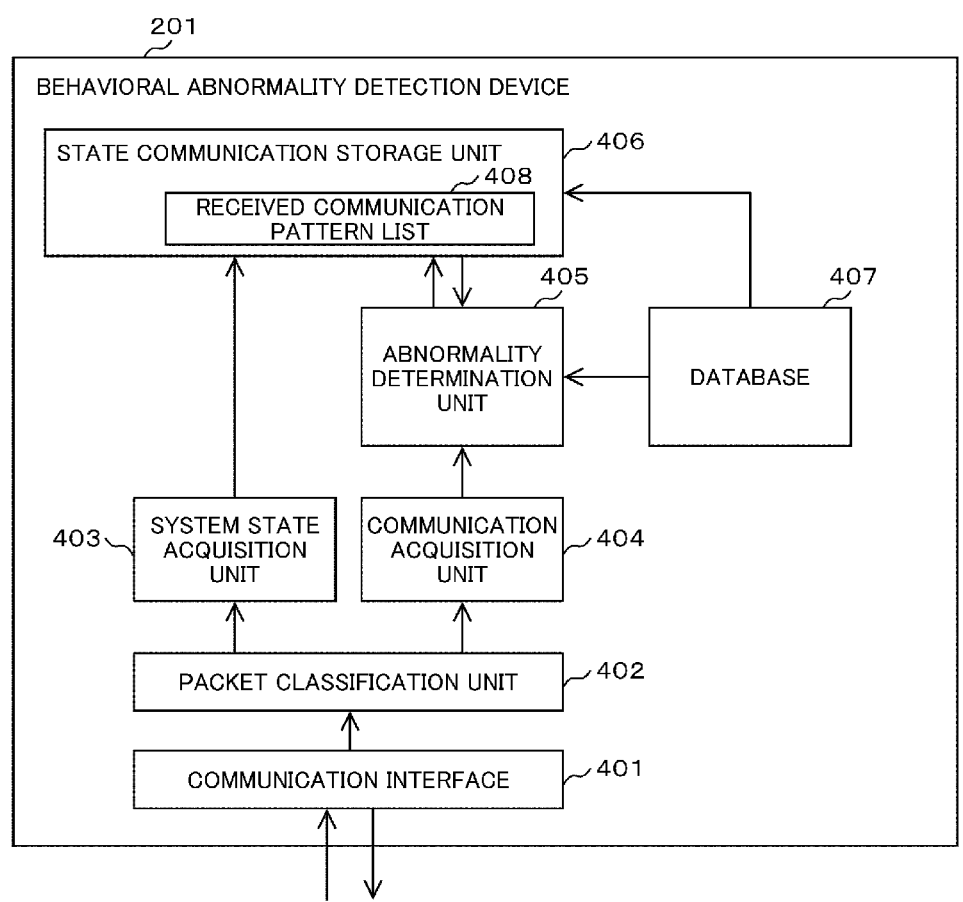

F I G. 5

| | SYSTEM STATE | NORMAL PATTERN OF COMMUNICATION | |
|---|---|---|---|
| | | SOURCE ADDRESS | DESTINATION ADDRESS |
| 503 | PROGRAMMING MODE | B | F |
| | | B | G |
| 504 | POWER GENERATION TARGET SETTING MODE | D | F |
| | | D | G |
| 505 | OPERATING MODE | F | C |
| | | G | C |
| | | F | G |
| | | G | F |
| 506 | OPERATION MONITORING MODE | F | C |
| | | G | C |
| | | F | G |
| | | G | F |
| | | C | E |
| 507 | MAINTENANCE MODE | A | F |
| | | A | G |

407 DATABASE
501 / 502

F I G. 6 A

ACQUIRED COMMUNICATION PATTERN

| SYSTEM STATE | ACQUIRED COMMUNICATION PATTERN ||
|---|---|---|
| | SOURCE ADDRESS | DESTINATION ADDRESS |
| PROGRAMMING MODE | B | F |
| | B | G |

F I G. 6 B

ACQUIRED COMMUNICATION PATTERN LIST  408

| SYSTEM STATE | ACQUIRED COMMUNICATION PATTERN ||
|---|---|---|
| | SOURCE ADDRESS | DESTINATION ADDRESS |
| PROGRAMMING MODE | B | F |
| | B | G |

F I G. 7

ACQUIRED COMMUNICATION PATTERN

| SYSTEM STATE | ACQUIRED COMMUNICATION PATTERN ||
|---|---|---|
| | SOURCE ADDRESS | DESTINATION ADDRESS |
| POWER GENERATION TARGET SETTING MODE | A | F |

FIG. 8A

ACQUIRED COMMUNICATION PATTERN

| SYSTEM STATE | ACQUIRED COMMUNICATION PATTERN | |
| --- | --- | --- |
| | SOURCE ADDRESS | DESTINATION ADDRESS |
| OPERATING MODE | F | C |
| | G | C |
| | G | F |

FIG. 8B

ACQUIRED COMMUNICATION PATTERN LIST    408

| SYSTEM STATE | ACQUIRED COMMUNICATION PATTERN | |
| --- | --- | --- |
| | SOURCE ADDRESS | DESTINATION ADDRESS |
| OPERATING MODE | F | C |
| | G | C |
| | G | F |

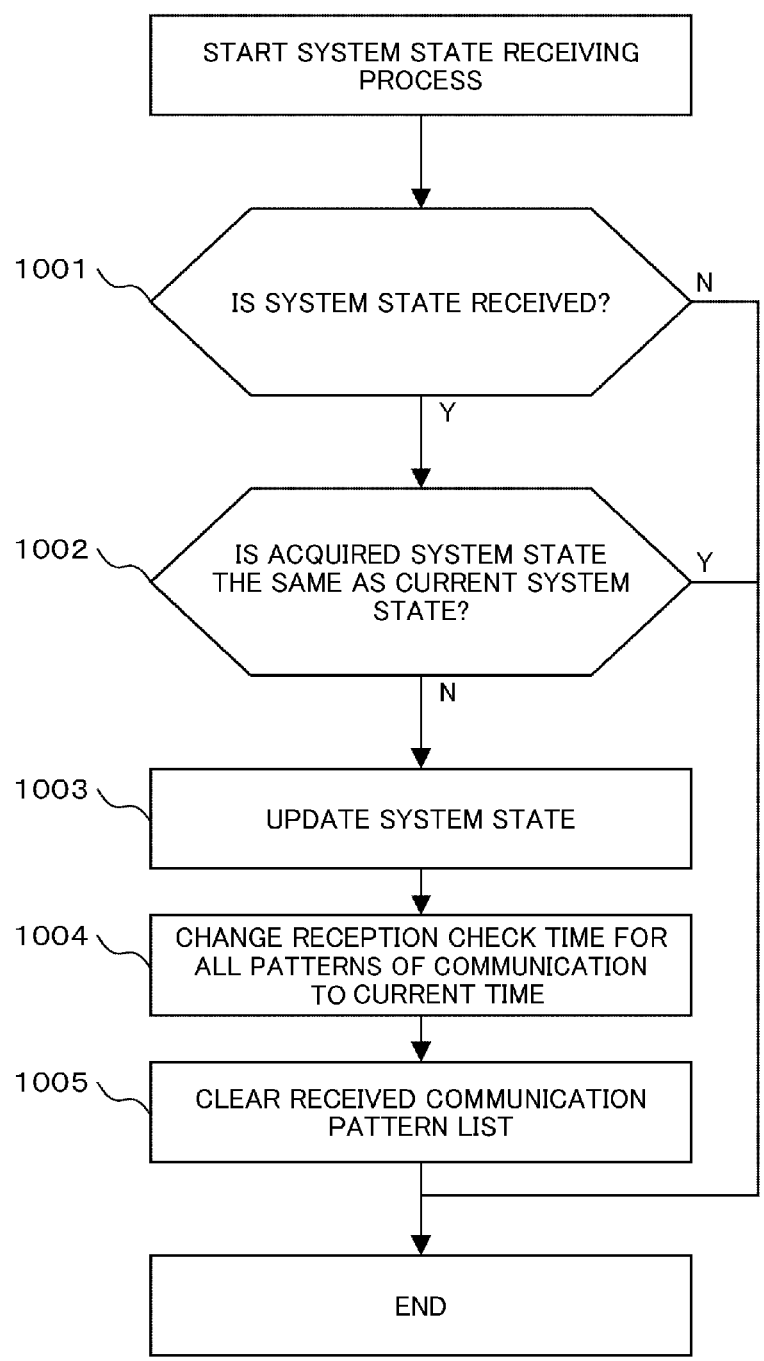
F I G. 1 0

F I G. 1 2
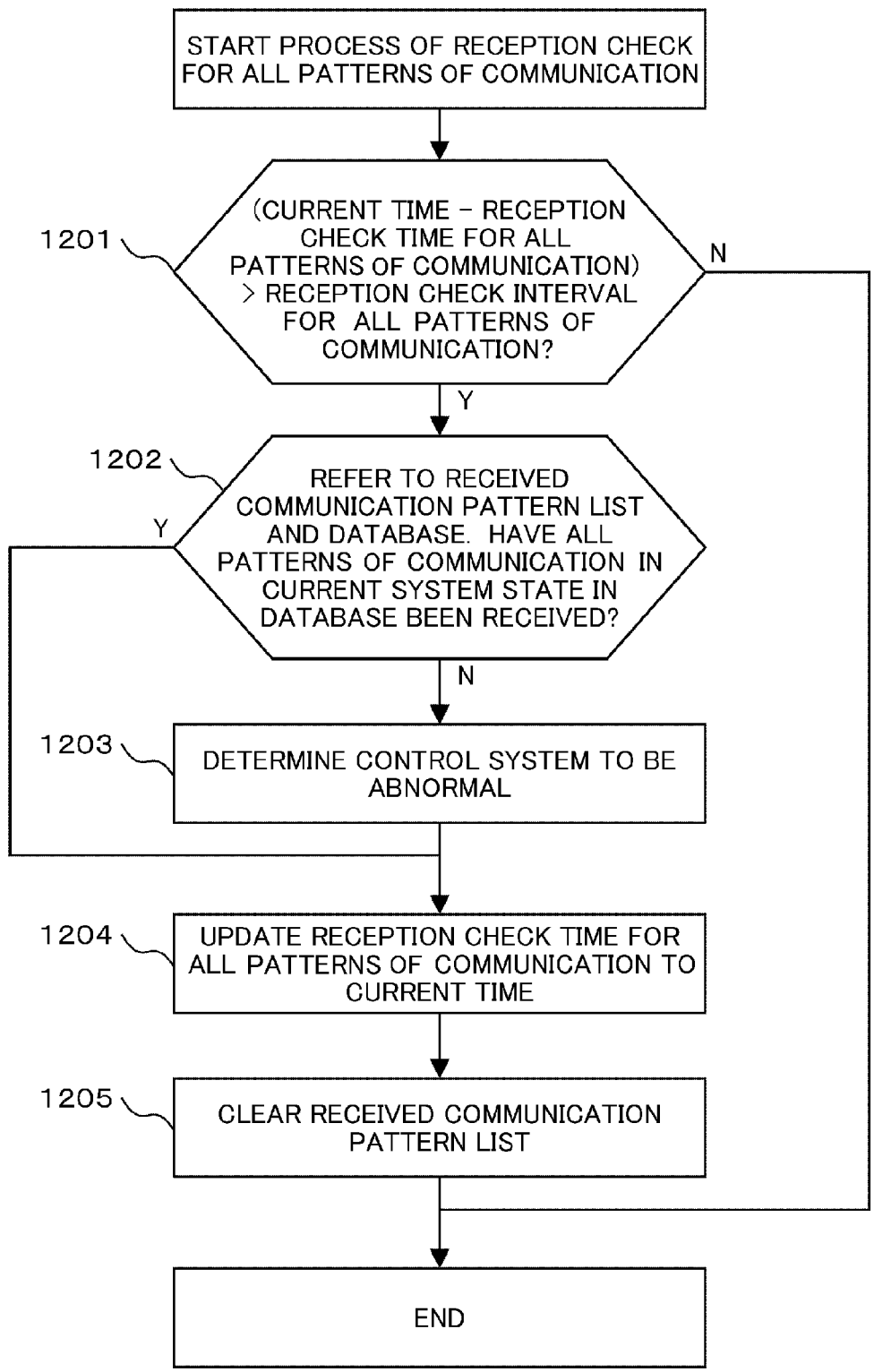

F I G. 1 3
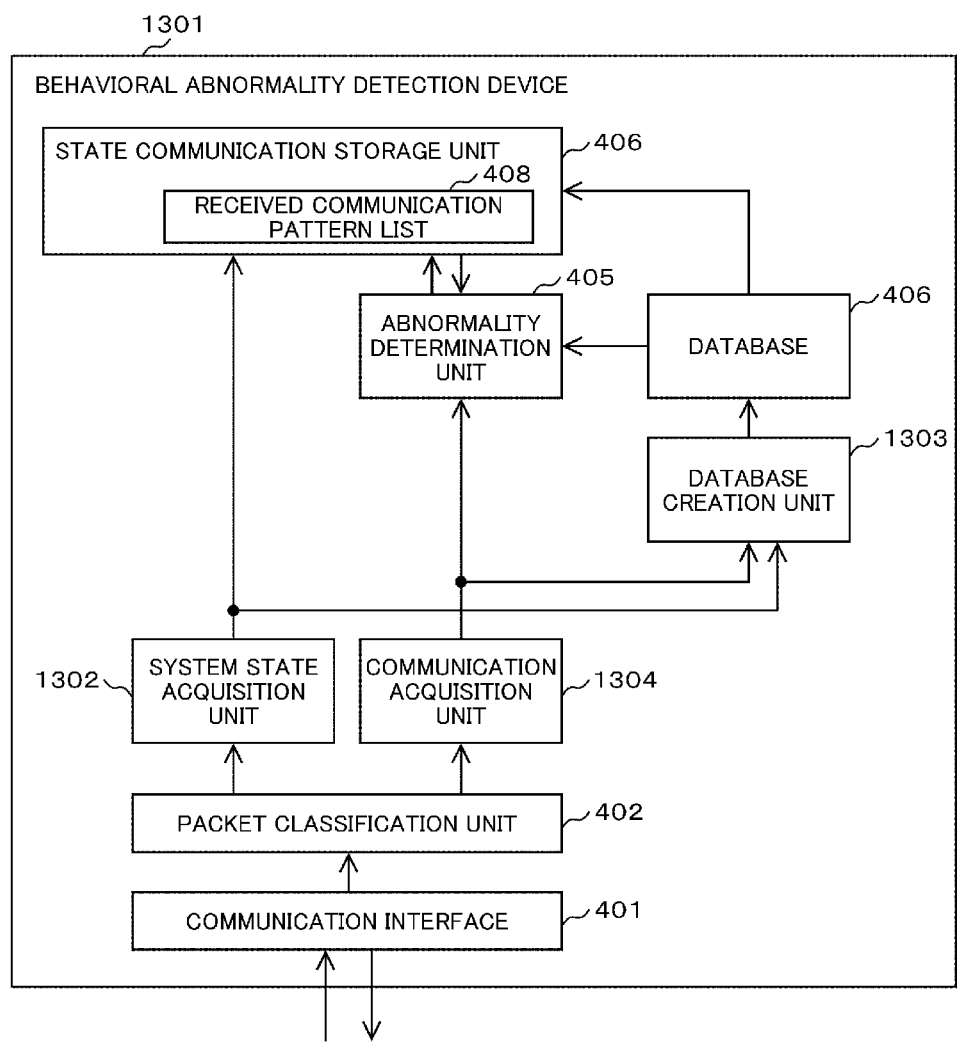

F I G. 1 7
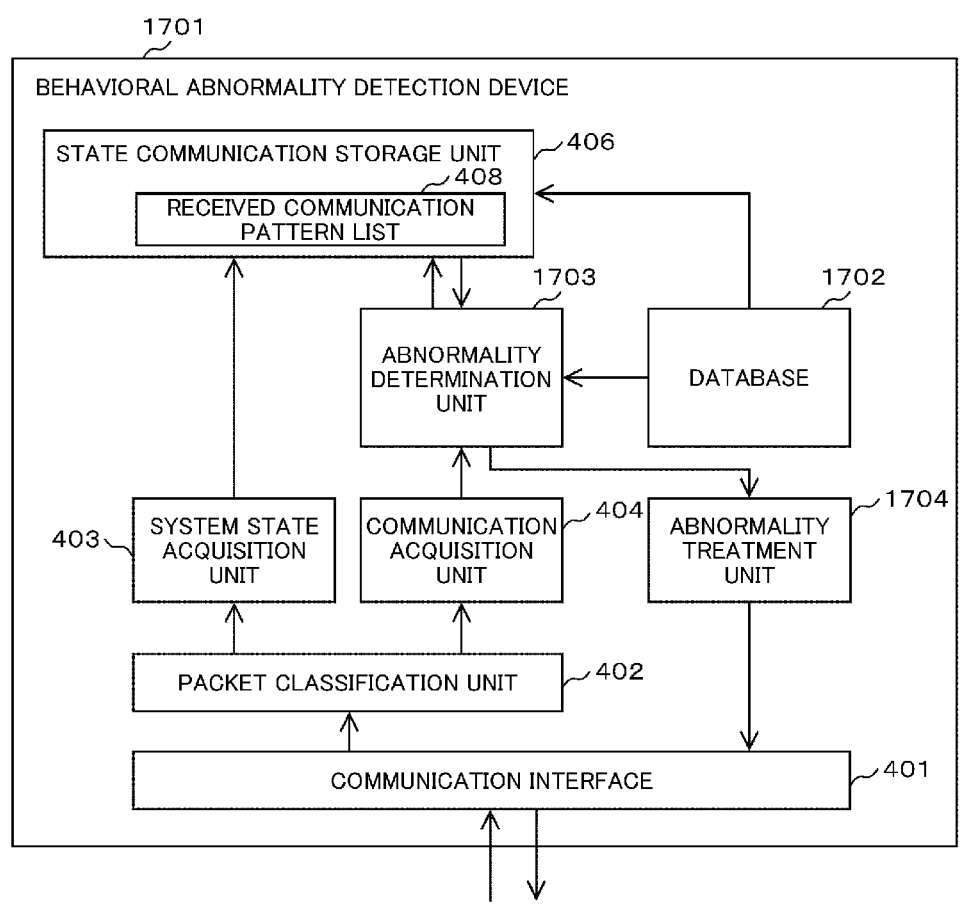

FIG. 18

DATABASE 1702

| SYSTEM STATE 501 | NORMAL PATTERN OF COMMUNICATION 502 | | ABNORMALITY TREATMENT METHOD 1801 |
|---|---|---|---|
| | SOURCE ADDRESS | DESTINATION ADDRESS | |
| 503 PROGRAMMING MODE | B | F | BLOCK ABNORMAL COMMUNICATION AND NOTIFY ADMINISTRATOR 1802 |
| | B | G | |
| 504 POWER GENERATION TARGET SETTING MODE | D | F | BLOCK ABNORMAL COMMUNICATION AND NOTIFY ADMINISTRATOR 1803 |
| | D | G | |
| 505 OPERATING MODE | F | C | NOTIFY ADMINISTRATOR 1804 |
| | G | C | |
| | F | G | |
| | G | F | |
| 506 OPERATION MONITORING MODE | F | C | NOTIFY ADMINISTRATOR 1805 |
| | G | C | |
| | F | G | |
| | G | F | |
| | E | C | |
| 507 MAINTENANCE MODE | A | F | BLOCK ABNORMAL COMMUNICATION AND NOTIFY ADMINISTRATOR 1806 |
| | A | G | |

INFORMATION CONTROLLER, INFORMATION CONTROL SYSTEM, AND INFORMATION CONTROL METHOD

TECHNICAL FIELD

The present invention relates to an information controller, an information control system, and an information control method. In particular, the present invention relates to an abnormality detector, an abnormality detection system, and an abnormality detection method for a control network.

BACKGROUND ART

There is a growing trend to automatically perform control, maintenance, and monitoring of devices operating in power plants, water supply and sewerage systems, automobile manufacturing plants, chemical plants, and the like via a network. In a control network used in an automobile manufacturing plant or a chemical plant, for example, when an abnormality occurs in the network or the network is stopped, production is stopped and damages are caused. Therefore, the control network is required to have higher availability as compared in an information network used for communication between PCs, a mail server, a Web server, a file server, and the like in a general office. Moreover, when abnormal communication such as writing of an unauthorized program into a device is overlooked in a control network used in a power plant, a water supply and sewerage system, or the like, a serious accident may be caused. Thus, the control network is required to have high reliability.

It was considered to be difficult to intrude the control network and perform an illegal operation or the like, because the control network conventionally used a unique communication protocol of each vendor. Moreover, the control network was conventionally operated while being separated from the Internet, and this made intrusion by an outside person to the network difficult. However, also in the control network, the use of an open communication protocol such as TCP/IP (Transmission Control Protocol/Internet Protocol) has been increasing these days. In addition, an operation form in which the control network is operated while connected with the Internet has widely spread for achieving a remote maintenance of a device in the control network through the Internet. Because of the use of an open communication protocol for the control network and connection of the control network with the Internet, illegal intrusion to the control network is possible and therefore attack cases to a control system are increasing.

An exemplary technique for detecting an abnormality such as intrusion and attack to a network is IDS (Intrusion Detection System). In Patent Literature 1 related to IDS, for example, a list of normal patterns of communication performed in a network is defined, and it is determined that an abnormality occurs when communication not matching the list has been performed.

CITATION LIST

Patent Literature

Patent Literature 1: Japanese Patent Application Publication No. 2012-84994

SUMMARY OF INVENTION

Technical Problem

A control system formed by devices connected to a control network switches between a plurality of system states in accordance with an operation stage. Exemplary system states of the control system include an operating mode and a maintenance mode. A pattern of communication in the control network changes in accordance with the system state of the control system.

In the technique described in Patent Literature 1, a normal communication list is created based on a communication index such as a source IP address, a destination IP address, a destination port number, or a communication protocol, and communication not existing in this list is detected as an abnormality. Thus, in a case where communication that is registered in the normal communication list but is not suitable for the current state of the control system is performed, that communication is not detected as an abnormality. Therefore, communication that is abnormal for the current state of the control system cannot be detected in some cases.

The present invention is for solving the above problem and aims to detect unauthorized communication that is not suited for the state of a control system as an abnormality, thereby enhancing the availability and reliability of a control network.

Solution to Problem

As an aspect of the present invention for solving at least one of the aforementioned problems, a normal pattern of communication between devices is stored for each state of a system; information indicating a state of the system is acquired and the state of the system is determined; information indicating a pattern of communication between the devices is acquired and the pattern of communication is determined; and it is determined whether or not an abnormality occurs in the system based on the determined pattern of communication and the pattern of communication stored as a normal pattern of communication in the determined state of the system.

Advantageous Effects of Invention

It is possible to enhance the availability and reliability of a control network.

BRIEF DESCRIPTION OF EMBODIMENTS

FIG. 1 is a diagram showing the entire structure of a control system of the present embodiment.

FIG. 4 is a block diagram showing a behavioral abnormal detection device of the first example.

FIG. 5 shows the details of a database included in the behavioral abnormality detection device of the first example.

FIGS. 6A and 6B show examples of a system state and a pattern of communication acquired by the behavioral abnormality detection device of the first example, and a received communication pattern list.

FIG. 7 shows an example of a system state and a pattern of communication acquired by the behavioral abnormality detection device of the first example.

FIGS. 8A and 8B show examples of a system state and a pattern of communication acquired by the behavioral abnormality detection device of the first example, and a received communication pattern list.

FIG. 10 is a flowchart showing a system state receiving process of the behavioral abnormality detection device of the first example.

FIG. 12 is a flowchart showing a process of reception check for all patterns of communication of the behavioral abnormality detection device of the first example.

FIG. 13 is a block diagram showing a behavioral abnormal detection device of the second example.

FIG. 17 is a block diagram showing a behavioral abnormal detection device of the fifth example.

FIG. 18 shows the details of a database included in the behavioral abnormality detection device of the fifth example.

DESCRIPTION OF EMBODIMENTS

Figure 2:
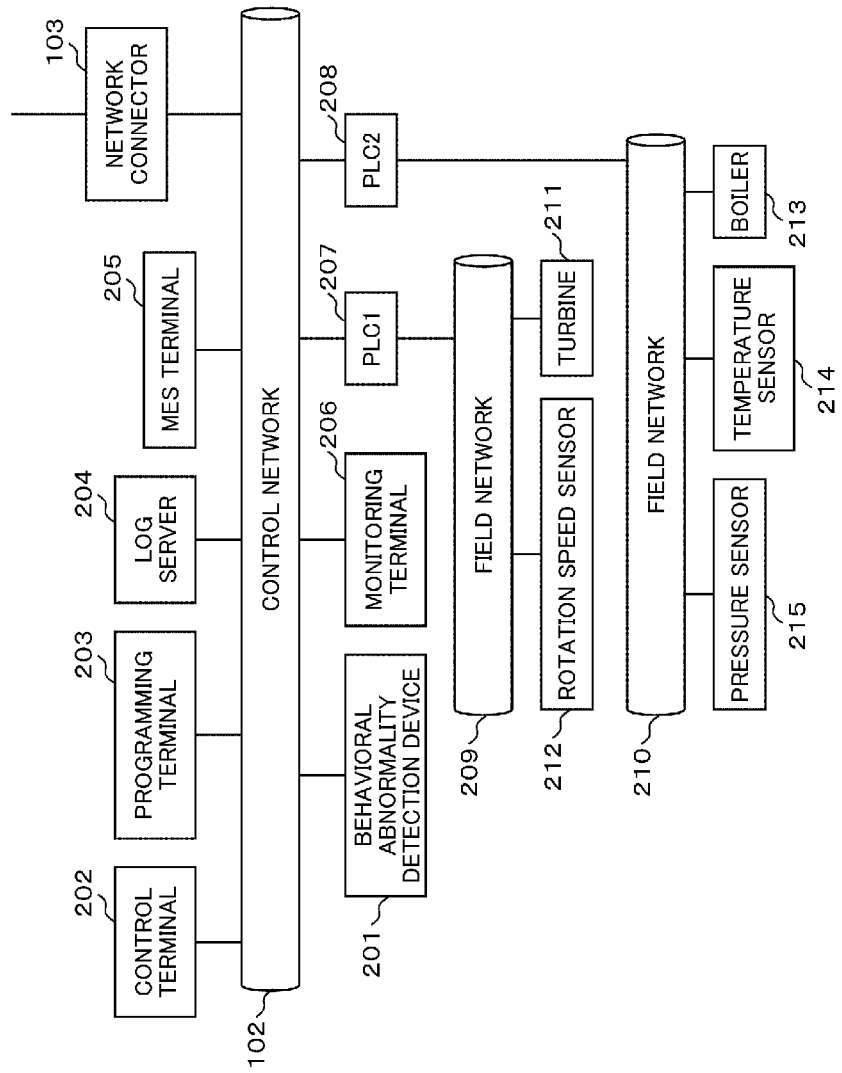
FIG. 2 is a diagram showing the entire structure of a control network of the present embodiment.

An example of the present invention is described below, referring to the drawings.

FIG. 1 shows the entire structure of a control system related to the example of the present invention. In this example, an example is shown in which a control network 102 is applied to a thermal power plant 101. However, the control network 102 can also be applied to a nuclear power plant, a wind power plant, a hydraulic power plant, a water supply and sewerage system, a petroleum plant, a chemical plant, an automobile manufacturing plant, a food manufacturing plant, a steel manufacturing plant, or others. In the example of FIG. 1, the control network 102 is provided within the thermal power plant 101. To the control network 102, various types of devices operating in the thermal power plant 101 are connected. The control network 102 is connected to an information network 105 provided within an office 104 through a network connector 103. The information network 105 is a network to which information devices used for OA (office automated) tasks are connected. For example, a PC (Personal Computer), a file server, a Web server, a mail server, or a printer is connected in the information network 105. The information network 105 is connected to the Internet 107 via a network connector 106. A remote monitor/control center 108 which performs control, maintenance, and monitoring and the like for the thermal power plant from a remote place is connected via the Internet 107.

The network connector 103 or 106 is a device relaying communication between devices connected to the network and is a router, a layer 3 switch, a switching hub, or a repeater hub, for example.

FIG. 2 shows an exemplary entire structure of the control network 102 related to the example of the present invention. To the control network 102 in FIG. 2, a behavioral abnormality detection device 201, a control terminal 202, a programing terminal 203, a log server 204, a MES (Manufacturing Execution System) terminal 205, a monitoring terminal 206, and PLCs (Programmable Logic Controllers) (207 and 208) are connected via the network connector 103.

Among the devices forming the control network 102, the behavioral abnormality detection device 201 is essential. As for the other devices, one or more of them may not be provided. The control network 102 is a network configured by wires, wirelessly, or by both wired and wireless portions.

The network connector 103 is a device which connects devices connected to the control network 102, and corresponds to a router, a layer 3 switch, a switching hub, or a repeater hub, for example. The topology of the control network 102 in FIG. 2 may be a star topology, a bus topology, a ring topology, or another topology, or a combination thereof.

The control terminal 202 is a terminal which performs tasks such as a firmware update for the PLC (207, 208) via the control network 102. The programming terminal 203 is a terminal which writes a control program running on the PLC (207, 208) onto the PLC (207, 208) via the control network 102.

The log server 204 is a device which collects and records therein operation logs of the PLC (207, 208) via the control network 102. The log server 204 transmits the recorded operation logs to the monitoring terminal 206 via the control network 102 in response to a request from the monitoring terminal 206.

The MES terminal 205 is a device transmitting information such as a target of power generation to the PLC (207, 208) via the control network 102. The monitoring terminal 206 is a device which makes an access to the log server 204 via the control network 102 to acquire the log data and monitor the operating state of the PLC (207, 208), for example.

The PLC (207, 208) is connected to a field device such as an actuator, a motor, or a sensor. A field network (209, 210) is a network used by a controller such as the PLC (207, 208) for controlling the field device. The field network (209, 210) is a network configured by wires, wirelessly, or by both wired and wireless portions. Exemplary specifications for the field network (209, 210) include Profibus, Modbus, HART, WirelessHART, and ISA100.11a.

In the structure of FIG. 2, the PLC1 (207) and the PLC2 (208) are connected to the field devices via the networks (209 and 210), respectively. However, the structure employing direct connection, not via the network, can be used. The PLC 1 (207) is connected to a turbine 211 and a rotation speed sensor 212 via the field network 209. The PLC1 (207) acquires rotation speed information from the rotation speed sensor 212 which measures the rotation speed of the turbine 211 via the field network 209. Also, the PLC1 (207) transmits a control command to the turbine 211 via the field network 209. The PLC2 (208) is connected to a boiler 213, a temperature sensor 214, and a pressure sensor 215 via the field network 210. The PLC2 (208) acquires temperature information from the temperature sensor 214 which measures the temperature of the boiler 213 via the field network 210. The PLC2 (208) acquires pressure information from the pressure sensor 215 measuring the pressure of the boiler 213 via the field network 210. The PLC2 (208) transmits a control command to the boiler 213 via the field network 210.

Figure 3:
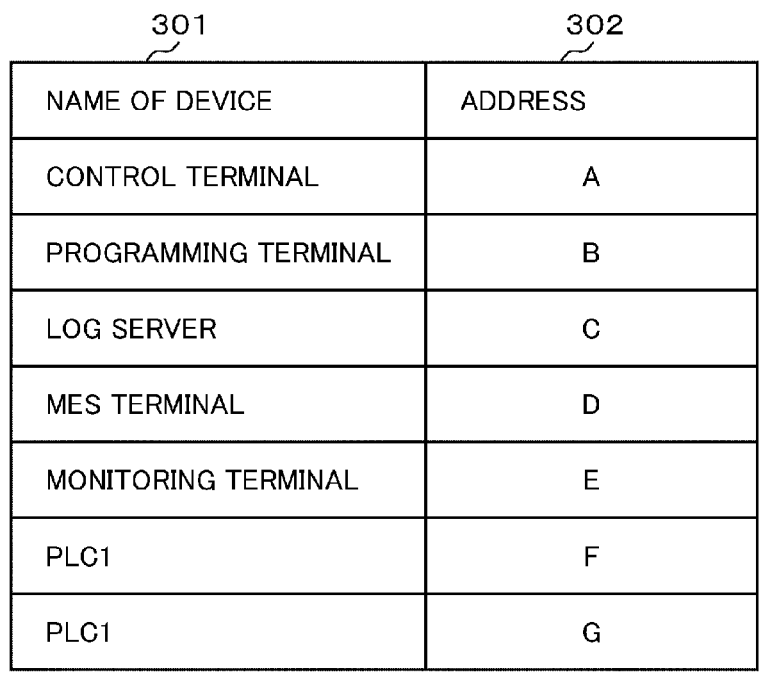
FIG. 3 shows correspondences between the names of devices connected to the control network and addresses in the present embodiment.

FIG. 3 is a table showing correspondences between the device names 301 of the devices connected to the control network 102 of this example and addresses 302. The address of the control terminal 202 is A. The address of the programming terminal 203 is B. The address of the log server 204 is C. The address of the MES terminal 205 is D. The address of the monitoring terminal 206 is E. The address of the PLC1 (207) is F. The address of the PLC2 (208) is G. Exemplary addresses are an IP address and a MAC address.

The address may be another address as long as it can uniquely specify a device connected to the control network.

EXAMPLE 1

FIG. 4 is a functional block diagram of the behavioral abnormality detection device 201 in the first example of the present invention. The behavioral abnormality detection device 201 is formed by a communication interface 401, a packet classification unit 402, a system state acquisition unit 403, a communication acquisition unit 404, an abnormality determination unit 405, a state communication storage unit 406, a database 407, and a received pattern list 408. The database 407 shows correspondences between system states and normal patterns of communication in those system states.

FIG. 5 shows an example of the database 407. The system state defines a state of a group of devices forming the control system as a whole. Examples of the system state 501 include a programming mode 503, a power generation target setting mode 504, an operating mode 505, an operation monitoring mode 506, and a maintenance mode 507, as shown in FIG. 5. The programming mode 503 indicates a state in which writing of a control program is being performed to the PLC1 (207) or the PLC2 (208) from the programming terminal 203. The power generation target setting mode 504 indicates a state in which a target of power generation is set in the PLC1 (207) or the PLC2 (208) from the MES terminal 205. The operating mode 505 indicates a state in which the PLC1 (207) or the PLC2 (208) controls a device such as the turbine 211 or the boiler 213, in accordance with a set program and the target of power generation. The operation monitoring mode 506 is a state in which the PLC1 (207) or the PLC2 (208) controls a device such as the turbine 211 or the boiler 213, in accordance with a set program and the target of power generation as in a case where the system state 501 is the operating mode 505, and the monitoring terminal 206 is monitoring the operating state of each device.

The maintenance mode 507 indicates a state in which maintenance task such as writing of a firmware to the PLC1 (207) or the PLC2 (208) from the control terminal 202 is being performed. In the control network 102, communication in a specific pattern is carried out in accordance with the system state 501 of the control system. In the database 407 shown in FIG. 5, when the control system is in the programming mode 503, the following two normal patterns of communication are defined. One is communication for performing writing of an operation programming from the programming terminal 203 having the address B to the PLC1 (207) having the address F. The other is communication for performing writing of an operation programming from the programming terminal 203 having the address B to the PLC2 (208) having the address G. In the database 407 shown in FIG. 5, when the control system is in the power generation target setting mode 504, the following two normal patterns of communication are defined. One is communication for writing the target of power generation to the PLC1 (207) having the address F from the MES terminal 205 having the address D. The other is communication for writing the target of power generation to the PLC2 (208) having the address G from the MES terminal 205 having the address D.

In the database 407 shown in FIG. 5, when the control system is in the operating mode 505, the following four normal patterns of communication are defined. The first one is communication for writing the operation log from the PLC1 (207) having the address F to the log server 204 having the address C. The second one is communication for writing the operation log from the PLC2 (208) having the address G to the log server 204 having the address C. The third one is communication from the PLC1 (207) having the address F to the PLC2 (208) having the address G. This third communication is for notifying the PLC2 (208) of the operation state of the turbine 211 or the rotation speed sensor 212 connected to the PLC1 (207) via the field network 209. The fourth one is communication from the PLC2 (208) having the address G to the PLC1 (207) having the address F. This fourth communication is for notifying the PLC1 (207) of the operation state of the boiler 213, the temperature sensor 214, or the pressure sensor 215, which is connected to the PLC2 (208), via the field network 210. The above third and fourth ones are generally called as cyclic communication or memory transfer which is performed for sharing the operation state of a device connected under each PLC by a plurality of PLCs connected to the control network. When the control system is in the operation monitoring mode 506, the following five normal patterns of communication are defined. Four of the five normal patterns of communication are the same as those in the case where the system state is the operating mode 505.

The fifth one is communication for transmitting the operation log recorded in the log server 204 from the log server 204 having the address C to the monitoring terminal 206 having the address E. Although a set of a source address and a destination address is defined as a normal pattern of communication in the database 407 shown in FIG. 5, the normal pattern of communication can be defined by using another index. Examples of the other index for defining the normal pattern of communication include a port number, a packet size, a communication interval, and a communication frequency.

The communication interface 401 receives a packet of communication within the control network 102 and inputs it to the packet classification unit 402.

The packet classification unit 402 refers to the header or the content of the packet input from the communication interface 401, and determines whether that packet is a system state notification packet or a communication packet. The system state notification packet is a packet for notification of a system state. For example, the system state notification packet is transmitted from an administrator of the control system via a device connected to the control network 102, or is transmitted from the administrator of the control system via a device connected to the information network 105 that is at an upper level of the control network 102, or is transmitted from the administrator of the control system in the remote management center via the Internet 107. The system state notification packet may be transmitted by another method. Alternatively, the system state notification packet may be input directly to the behavioral abnormality detection device 201 not via the network.

The communication packet is a normal packet of communication performed between devices connected to the control network 102. When the packet input from the communication interface 401 is the system state notification packet, the packet classification unit 402 inputs it to the system state acquisition unit 403. When the packet input from the communication interface 401 is the communication packet, the packet classification unit inputs it to the communication acquisition unit 404.

When the system state notification packet is input from the packet classification unit 402, the system state acquisition unit 403 extracts the system state and inputs it to the state communication storage unit 406.

The communication acquisition unit 404 refers to the content of the communication packet input from the packet classification unit 402 and extracts the source address and the destination address of that communication packet. The communication acquisition unit 404 inputs the thus extracted source address and destination address to the abnormality determination unit 405. In a case where the set of the source address and the destination address input from the abnormality determination unit 405 is not registered in the received communication pattern list 408, the state communication storage unit 406 records that set of the source address and the destination address into the received communication pattern list 408.

When receiving the set of the source address and the destination address from the communication acquisition unit 404, the abnormality determination unit 405 acquires a current system state recorded in the state communication storage unit 406. Then, the abnormality determination unit 405 refers to the database 407 to check the list of the normal patterns of communication 502 corresponding to the current system state 501. When the set of the source address and the destination address acquired from the communication acquisition unit 404 is in that list, the abnormality determination unit 405 determines that the control system is normally operating, and inputs that set of the source address and the determination address to the state communication storage unit 406. When that set of the source address and the destination address is not in the normal patterns of communication 502, the abnormality determination unit 405 determines that an abnormality occurs in the control system.

The abnormality determination unit 405 has a clock function and manages a current time, a reception check time for all patterns of communication, and a reception check interval for all patterns of communication. The reception check interval for all patterns of communication is set in advance. The abnormality determination unit 405 performs the following, when a value obtained by subtracting the reception check time for all patterns of communication from the current time is equal to or larger than the reception check interval for all patterns of communication. The abnormality determination unit 405 updates the reception check time for all patterns of communication to the current time. The abnormality determination unit 405 acquires the current system state and the received communication pattern list 408 from the state communication storage unit 406. Then, the abnormality determination unit 405 refers to the database 407 and the received communication pattern list 408, and checks whether or not all normal patterns of communication 502 for the current system state 501 have been received. In a case where all normal patterns of communication have been received, the abnormality determination unit 405 determines that the control system is normally operating. In a case where there are one or more normal patterns of communication that are not received, the abnormality determination unit 405 determines whether or not an abnormality occurs in the control system in accordance with a procedure based on a threshold value of an elapsed time that will be described later referring to FIG. 12.

An abnormality determination method is described by using a specific example. FIGS. 6, 7, and 8 each shows a system state, a pattern of communication that the behavioral abnormality detection device acquired in that system state within a certain time period (the reception check interval for all patterns of communication), and a crated received communication pattern list 408.

The example of FIG. 6A shows a case where when the system state is the programming mode, two patterns of communication, i.e., communication from the address B to the address F and communication from the address B to the address G are acquired. Those two patterns of communication respectively match normal patterns of communication in a case where the system state 501 is the programming mode 503 in the database 407 of FIG. 5. Thus, the control system is determined to be normal. Because the two patterns of communication, i.e., communication from the address B to the address F and communication from the address B to the address G match the normal patterns of communication in the case where the system state 501 is the programming mode 503 in the database 407 of FIG. 5, those patterns are registered into the received communication pattern list 408 of FIG. 6B. From the received communication pattern list 408 of FIG. 6B, it can be found that all the normal patterns of communication in the case where the system state 501 is the programming mode 503 in the database 407 of FIG. 5 have been received within the reception check interval for all patterns of communication. Thus, the control system is determined to be normal.

The example of FIG. 7 shows a case where when the system state is the power generation target setting mode, communication from the address A to the address F is acquired. The communication from the address A to the address F does not match the normal patterns of communication in the case where the system state 501 is the power generation target setting mode 504 in the database 407 of FIG. 5. Thus, the control system is determined to be abnormal.

The example of FIG. 8A shows a case where when the system state is the operating mode, communication from the address F to the address C, communication from the address G to the address C, and communication from the address G to the address F are acquired. Those three patterns of communication respectively match the normal patterns of communication in the case where the system state 501 is the operating mode 505 in the database 407 of FIG. 5. Thus, the control system is determined to be normal. Because the communication from the address F to the address C, the communication from the address G to the address C, and the communication from the address G to the address F match the normal patterns of communication in the case where the system state 501 is the operating mode 505 in the database 407 of FIG. 5, they are registered into the received communication pattern list 408 of FIG. 8B. From the received communication pattern list 408 of FIG. 8B, one of the normal patterns of communication in the case where the system state 501 is the operating mode 505 in the database 407, which is from the address F to the address G, has not been acquired and therefore the normal patterns of communication in the case where the system state 501 is the operating mode 505 have not been received entirely within the reception check interval for all patterns of communication. Thus, the control system is determined to be abnormal.

The details of the operation of the behavioral abnormal detection device 201 are described, referring to a flowchart.

Figure 9:
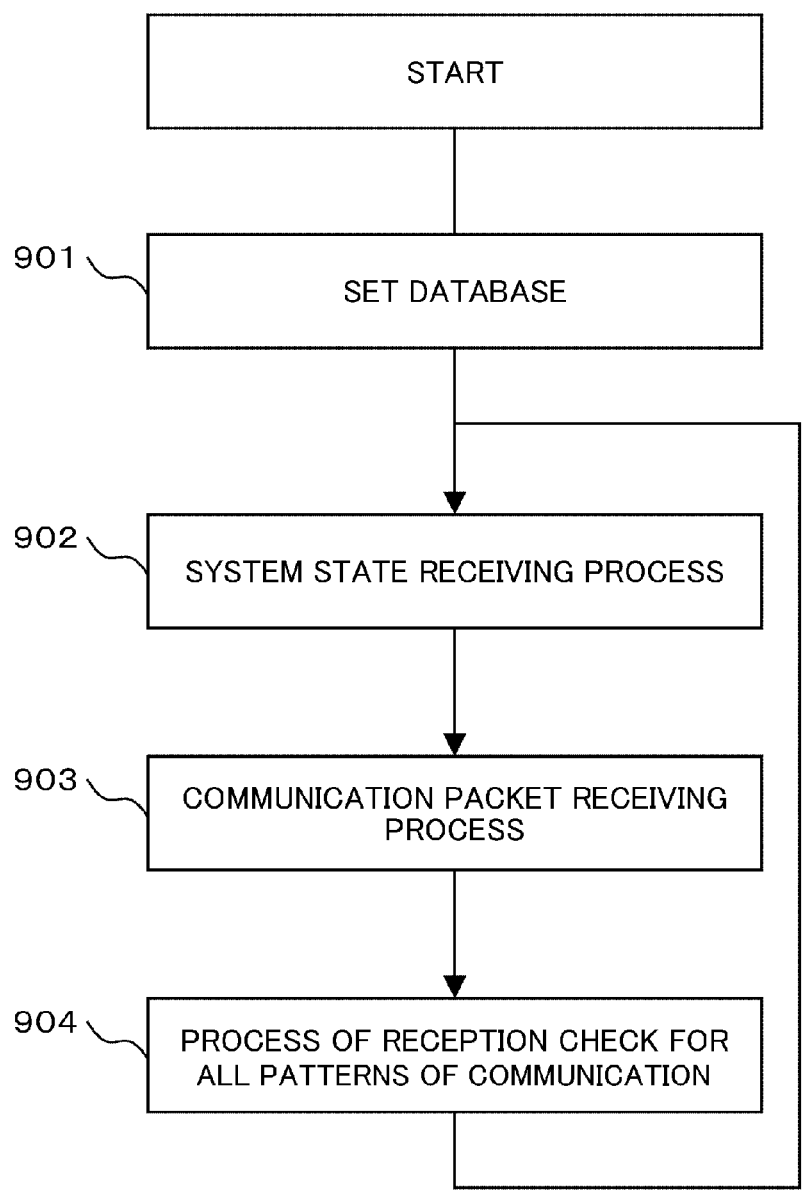
FIG. 9 is a flowchart showing the entire operation of the behavioral abnormality detection device of the first example.

The entire operation flow of the behavioral abnormal detection device is described, referring to FIG. 9. First, a database is set (901). Then, a system state receiving process (902), a communication packet receiving process (903), and a process of reception check for all patterns of communication (904) are repeated in this order. As for the setting of the database (901), the database may be created by a system administrator. The behavioral abnormality detection device 201 may automatically create the database. The database may be updated while the behavioral abnormality detection device 201 is operating.

FIG. 10 shows the details of the system state receiving process (902) of FIG. 9. First, in the system state receiving process (902) it is checked whether or not the system state has been received (1001). In a case where the system state has not been received, the process is ended. In a case where the system state has been received, it is then checked whether or not the received system state is the same as the current system state (1002). In a case where the received system state is the same as the current system state, the process is ended. In a case where the received state is different from the current system state, the system state is updated (1003). Then, the reception check time for all patterns of communication is updated to the current time (1004). Subsequently, the received communication pattern list is cleared (1005) and the process is ended.

Figure 11:
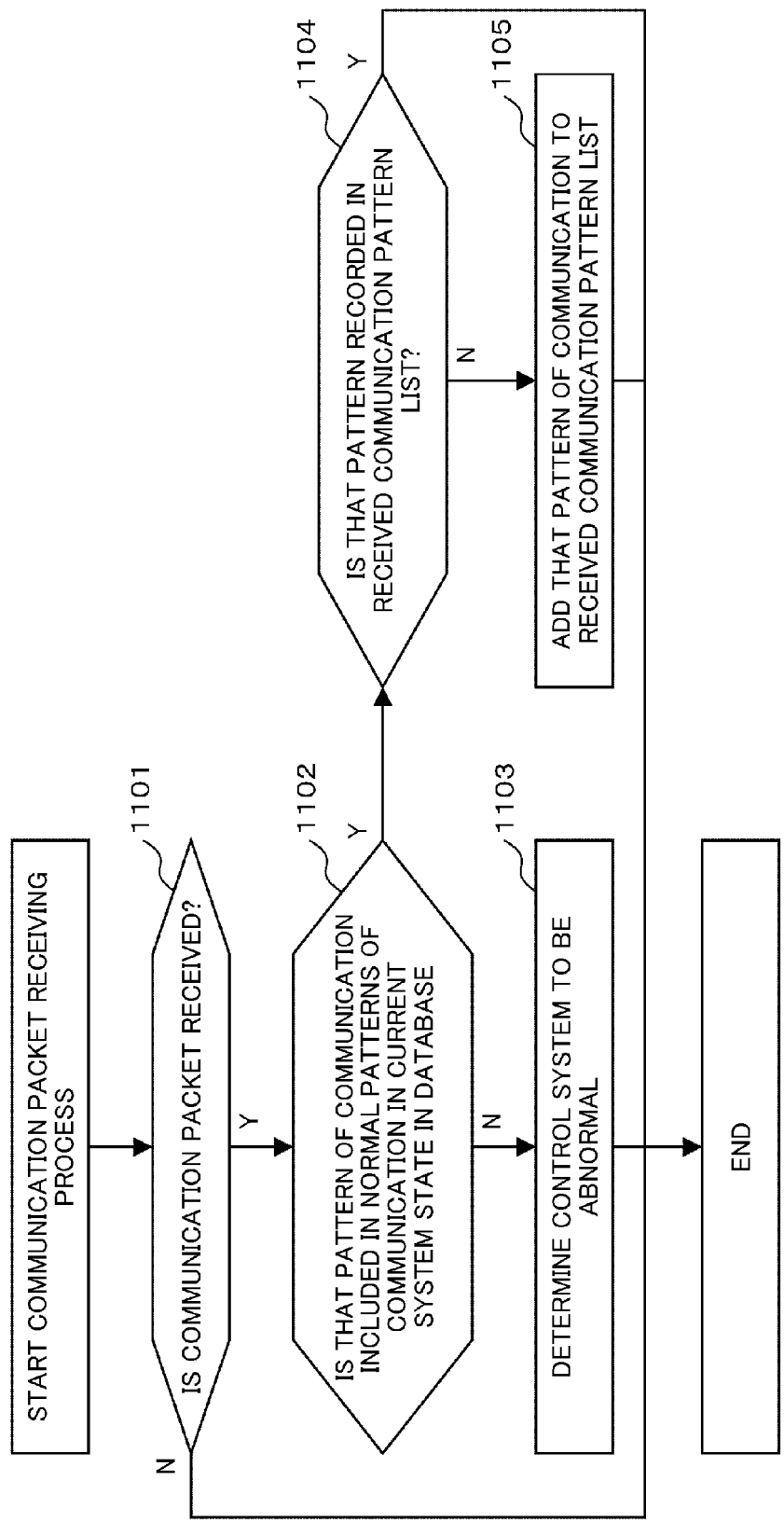
FIG. 11 is a flowchart showing a communication packet receiving process of the behavioral abnormality detection device of the first example.

FIG. 11 shows the details of the communication packet receiving process (903) of FIG. 9. First, it is checked whether or not a communication packet has been received (1101). In a case where no communication packet has been received, the process is ended. In a case where a communication packet has been received, it is checked whether or not there is a corresponding pattern of communication in the normal patterns of communication in the current system state in the database (1102). In a case where there is no corresponding pattern of communication in the normal patterns of communication in the current system state in the database, the control system is determined to be abnormal (1103) and the process is ended. In a case where there is the corresponding pattern of communication in the normal patterns of communication in the current system state in the database, it is checked whether or not that corresponding pattern of communication is in the received communication pattern list (1104). In a case where the received communication list has that corresponding pattern of communication recorded therein, the process is ended. In a case where the received communication pattern list does not have that corresponding pattern of communication recorded therein, that corresponding pattern of communication is added to the received communication pattern list (1105) and the process is ended.

FIG. 12 shows the details of the process of reception check for all patterns of communication (904) of FIG. 9. First, it is checked whether or not a value obtained by subtracting the reception check time for all patterns of communication from the current time is larger than the reception check interval for all patterns of communication (1201). In a case where the value obtained by subtracting the reception check time for all patterns of communication from the current time is not larger than the threshold value, the process is ended. In a case where the value obtained by subtracting the reception check time for all patterns of communication from the current time is larger than the threshold value, the received communication pattern list and the database are referred to so that it is checked whether or not all the patterns of communication in the current system state in the database have been received (1202). In a case where all have been received, the reception check time for all patterns of communication is updated to the current time (1204), the received communication pattern list is cleared (1205), and the process is ended. In a case where all have not been received, the control system is determined to be abnormal (1203). Then, the reception check time for all patterns of communication is updated to the current time (1204), the received communication pattern list is cleared (1205), and the process is ended.

According to this example, when communication appropriate for a current system state is not performed, an abnormality of a system is detected, thereby a control network with high availability and reliability can be provided.

EXAMPLE 2

A behavioral abnormality detection device of this example is characteristic in creating a database automatically.

FIG. 13 shows the behavioral abnormality detection device 1303 of this example. In FIG. 13, a component operating in the same manner as each component in FIG. 4 is labeled with the same reference sign. When a system state notification packet is input from the packet classification unit 402, a system state acquisition unit 1302 of the behavioral abnormality detection device 1303 extracts a system state and inputs the system state to both the state communication storage unit 406 and a database creation unit 1303.

A communication acquisition unit 1304 refers to the content of the communication packet input from the packet classification unit 402, and extracts the source address and the destination address of that communication packet. The communication acquisition unit 1304 inputs the transmitting address and the destination address thus extracted to the abnormal determination unit 405, the state communication storage unit 406, and the database creation unit 1303.

The database creation unit 1303 creates the database 406 by using the system state input from the system acquisition unit 1302 and the source address and the destination address input from the communication acquisition unit.

Figure 14:
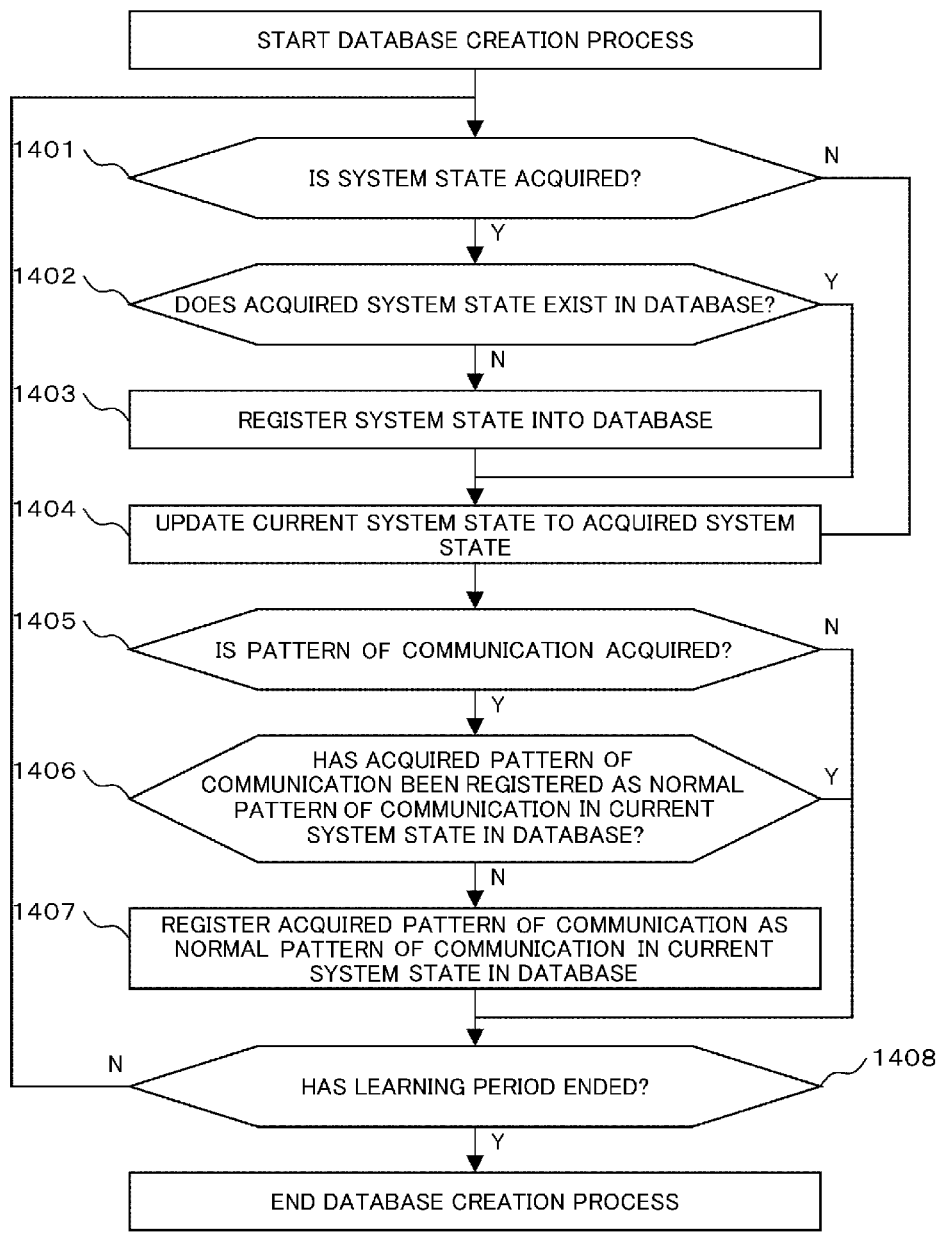
FIG. 14 is a flowchart showing a flow of database creation of the behavioral abnormality detection device of the second example.

A database creation process is described, referring to a flowchart for database creation in FIG. 14. First, it is checked whether or not the system state has been acquired (1401). In a case where the system state has not been acquired, it is checked whether or not a pattern of communication has been acquired (1405). In a case where the system state has been acquired, it is checked whether or not the acquired system state is in the database (1402). In a case where the acquired system state is not in the database, that system state is registered into the database (1403). Then, the current system state is updated to the acquired system state (1404). Subsequently, it is checked whether or not a pattern of communication has been acquired (1405). In a case where no pattern of communication has been acquired, it is checked whether or not a learning period has ended (1408). In a case where a pattern of communication has been acquired, it is then checked whether or not the acquired pattern of communication is registered as a normal pattern of communication in the current system state in the database (1406).

In a case where the acquired pattern of communication is registered as the normal pattern of communication in the current system state in the database, it is checked whether or not the learning period has ended (1408). In a case where the acquired pattern of communication is not registered as a normal pattern of communication in the current system state in the database, the acquired pattern of communication is registered as a normal pattern of communication in the current system state in the database (1407). Then, it is checked whether or not the learning period has ended (1408). In a case where the learning period has not ended, it is checked again whether or not a system state has been acquired (1401). When the learning period has ended, the database creation process is ended.

According to this example, the database is created automatically, thereby eliminating the necessity of manual creation of the database by an administrator or the like. Thus, it is possible to easily introduce the behavioral abnormality detection device.

EXAMPLE 3

A behavioral abnormality detection device of this example is characteristic in updating the database.

Figure 15:
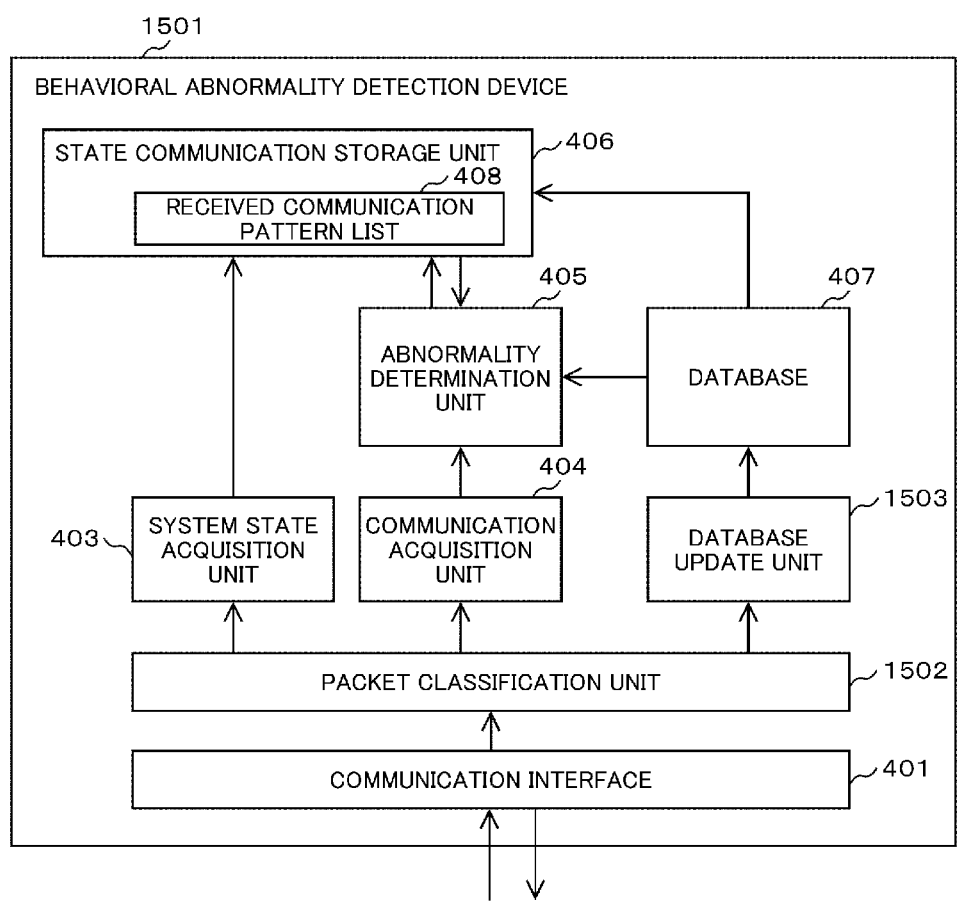
FIG. 15 is a block diagram showing a behavioral abnormal detection device of the third example.

FIG. 15 shows the behavioral abnormality detection device of this example. In FIG. 15, a component performing the same operation as that of each component of FIG. 4 is labeled with the same reference sign.

A packet classification unit 1502 of the behavioral abnormality detection device shown in FIG. 15 refers to the header or the content of a packet input from the communication interface 401, and determines whether the packet is a system state notification packet, a communication packet, or a database update notification packet. In a case where the packet input from the communication interface 401 is the system state notification packet, the packet classification unit 1502 inputs it to the system state acquisition unit. In a case where the packet input from the communication interface 401 is the communication packet, the packet classification unit 1502 inputs it to the communication acquisition unit 404. In a case where the packet input from the communication interface 401 is the database update notification packet, the packet classification unit 1502 inputs it to a database update unit 1503.

The system state notification packet is a packet for notification of the system state. The communication packet is a normal packet of communication between the devices connected to the control network. The database update notification packet is a packet for instructing the database update unit 1503 to update the database. When the database update notification packet input from the packet classification unit 1502 is input to the database update unit 1503, the database update unit 1503 extracts the content of the database update from the packet and updates the database 407.

According to this example, it is possible to detect an abnormality in the control network without overlooking it by updating the database, even in a case where the structure of the control network or the control system has been changed, for example, by addition of a new device to the control network.

EXAMPLE 4

A behavioral abnormality detection device of this example is characteristic in having an abnormality notification unit.

Figure 16:
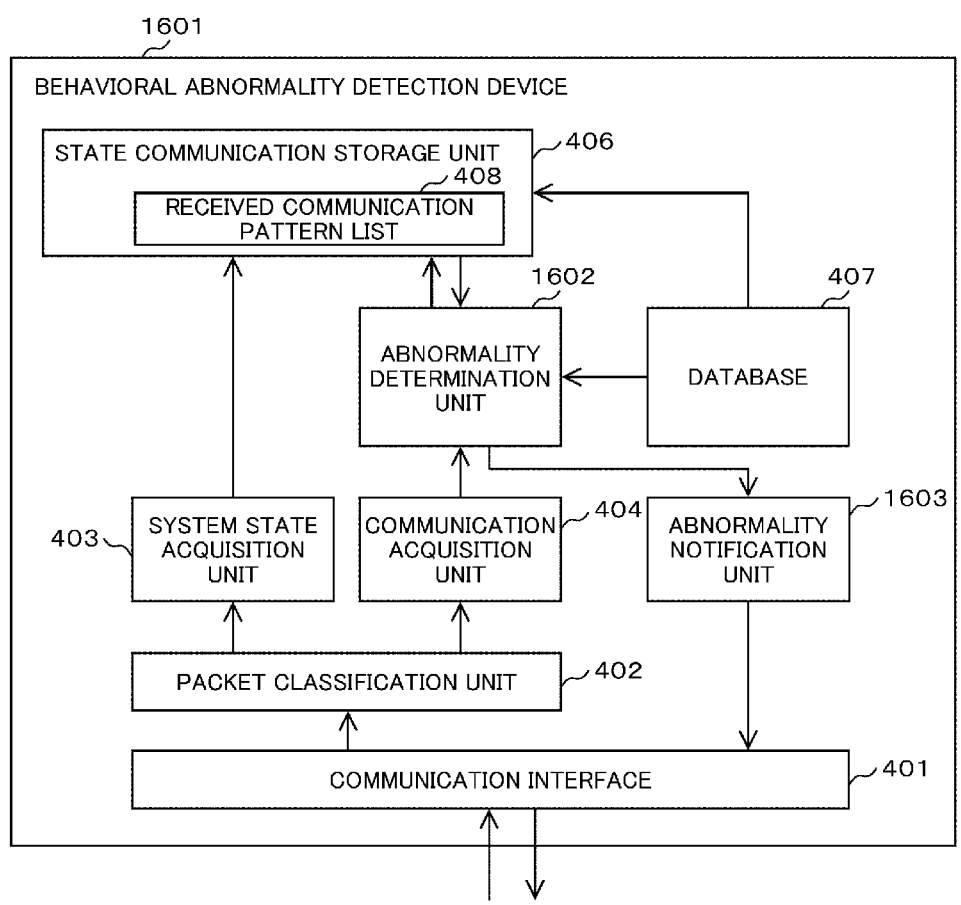
FIG. 16 is a block diagram showing a behavioral abnormal detection device of the fourth example.

FIG. 16 shows the behavioral abnormality detection device of this example. In FIG. 16, a component operating in the same manner as each component of FIG. 4 is labeled with the same reference sign.

When receiving a set of a source address and a destination address from the communication acquisition unit 404, an abnormality determination unit 1602 of the behavioral abnormality detection device 1601 shown in FIG. 16 acquires a current system state recorded in the state communication storage unit 406. Then, the abnormality determination unit 1602 refers to the database 407 to check a list of normal patterns of communication corresponding to the current system state. In a case where the set of the source address and the destination address acquired from the communication acquisition unit is in the list, the abnormality determination unit 1602 determines that the control system is normally operating. In a case where the acquired set is not in the list, the abnormality determination unit 1602 determines that an abnormality occurs in the control system, and inputs the determination result to the abnormality notification unit 1603. The abnormality determination unit 1602 performs the following operation regularly. The abnormality determination unit 1602 acquires the current system state and the received communication pattern list from the state communication storage unit 406.

Then, the abnormality determination unit 1602 refers to the database 407 to check whether or not the normal patterns of communication in the current system state have been received entirely. In a case where the normal patterns of communication have been received entirely, the abnormality determination unit 1602 determines that the control system is normally operating. In a case where there are one or more unreceived normal patterns of communication, the abnormality determination unit 1602 determines that an abnormality occurs in the control system, and inputs the determination result to the abnormality notification unit 1603. The abnormality notification unit 1603 notifies an administrator of the determination result from the abnormality determination unit 1602, indicating the occurrence or absence of the abnormality, via the communication interface 401. It can be considered that the administrator is within the control network 102, or within the information network 105, or at a remote place via the Internet 107.

According to this example, it is possible for the administrator of the control network to recognize an abnormality occurring in the control network even in a case where the administrator is at a place away from the control network.

EXAMPLE 5

A behavioral abnormality detection device of this example is characteristic in having a database for recording therein three including a system state, a normal pattern of communication corresponding to the system state, and an abnormality treatment method corresponding to the system state, and in carrying out the abnormality treatment method in accordance with the system state.

FIG. 17 shows the behavioral abnormality detection device 1701 of this example. In FIG. 17, a component operating in the same manner as each component of FIG. 4 is labeled with the same reference sign.

A database 1702 of the behavioral abnormality detection device shown in FIG. 17 shows a correspondence between a system state and a normal pattern of communication in that system state and a correspondence with an abnormality treatment method in a case where an abnormality has been detected in that system state. When detecting an abnormality, an abnormality determination unit 1703 notifies an abnormality treatment unit 1704 of the abnormality treatment method described in the database. The abnormality treatment unit 1704 carries out the abnormality treatment method received from the abnormality determination unit 1703. FIG. 18 shows an example of the database 1702 in this example. In a case where an abnormality is detected when the system state 501 is the programming mode 503, blocking of abnormal communication and notification to an administrator (1802) are carried out as an abnormality treatment method 1801. In a case where an abnormality is detected when the system state 501 is the power generation target setting mode 503, blocking of abnormal communication and notification to the administrator (1803) are carried out as the abnormality treatment method 1801. In a case where an abnormality is detected when the system state 501 is the operating mode 505, notification to the administrator (1804)

is carried out as the abnormality treatment method 1801. In a case where an abnormality is detected when the system state 501 is the operation monitoring mode 506, notification to the administrator (1805) is carried out as the abnormality treatment method 1801. In a case where an abnormality is detected when the system state 501 is the maintenance mode 507, blocking of abnormal communication and notification to the administrator (1806) are carried out as the abnormality treatment method 1801.

When the system state 501 is the operating mode 505 or the operation monitoring mode 506, the device such as the turbine 211 in the thermal power plant 101 is operating. In a case where while the device is operating, the communication determined to be abnormal by the behavioral abnormality detection device 1701 is communication actually necessary for control, the abnormal communication is not blocked, but only notification to the administrator is carried out. This is because loss of the control for the device may cause an accident or the like. When the system state 501 is the programming mode 503, the power generation target setting mode 504, or the maintenance mode 507, the device such as the turbine 211 in the thermal power plant is not operating. While the device is not operating, even if the communication determined to be abnormal by the behavioral abnormality detection device 1701 is actually normal communication, both the notification to the administrator and the blocking of the abnormal communication are carried out because it can be considered that the operation of the device is not affected.

According to this example, the abnormality treatment method is changed in accordance with the system state of the control system, thereby safe treatment of an abnormality can be performed while the abnormality of the system is detected. As described above, the invention made by the present inventor has been described specifically referring to the examples. However, the contents of the present invention are not limited to the examples, but can be modified in various ways in the scope not departing from the summary thereof. For example, each functional unit forming the behavioral detection device may be partly or entirely embedded into a network connection device such as a router, a layer 3 switch, a switching hub, or a repeater hub. Moreover, each functional unit forming the behavioral detection device may be embedded into two or more devices. Furthermore, a behavioral abnormality detection device may be formed by using one or more of the functional units of the behavioral abnormality detection devices described in the first to fifth examples in combination.

REFERENCE SIGNS LIST

101 Thermal power plant
102 Control network
103, 106 Network connector
104 Office
105 Control network
107 Internet
108 Remote monitor/control center
201, 1301, 1501, 1601, 1701 Behavioral abnormality detection device
202 Control terminal
203 Programming terminal
204 Log server
205 MES terminal
206 Monitoring terminal
207 PLC1
208 PLC2
209, 210 Field network
211 Turbine
212 Rotation speed sensor
213 Boiler
214 Temperature sensor
215 Pressure sensor
301 Name of device
302 Address
401 Communication interface
402, 1502 Packet classification unit
403, 1302 System state acquisition unit
404, 1304 Communication acquisition unit
405, 1602, 1703 Abnormality determination unit
406 State communication storage unit
407, 1702 Database
408 Received communication pattern list
501 System state
502 Normal pattern of communication
503 Programming mode
504 Power generation target setting mode
505 Operating mode
506 Operation monitoring mode
507 Maintenance mode
1303 Database creation unit
1503 Database update unit
1603 Abnormality notification unit
1704 Abnormality treatment unit
1801 Abnormality treatment method
1802, 1803, 1806 Blocking of abnormal communication and notification to administrator
1804, 1805 Notification to administrator

The invention claimed is:

1. An information controller of a power plant comprising:
a database configured to store a normal pattern of communication between two devices of a plurality of devices of the power plant for each mode state of a system of the power plant formed by the plurality of devices of the power plant connected to the information controller via a network;
a communication interface coupled to the network and to a system state acquisition device configured to acquire information indicating the mode state of the system to determine the mode state of the system; and
an abnormality determination device configured to:
acquire information indicating a pattern of communication between two of the plurality of devices,
determine whether or not an abnormality occurs in the system based on the acquired pattern of communication and a pattern of communication stored in the database as a normal pattern of communication in the mode state of the system determined by the system state acquisition unit, and
determine that the abnormality occurs in the system in a case where the normal communication in the database corresponding to the mode state of the system has not been performed entirely within a predetermined time period,
wherein the two devices include a first controller and a second controller connected to the network, and
wherein the communication of the acquired information indicating the pattern of communication is one of the first controller notifying the second controller of a state of a turbine of the power plant and a rotation speed of the turbine, and the second controller notifying the first controller of a state of a boiler of the power plant, a temperature of the boiler, and a pressure value of the boiler.

2. The information controller according to claim 1,
wherein the abnormality determination unit determines that the abnormality occurs in the system, in a case where at least a portion of the pattern of communication determined by the pattern of communication determination unit does not match the normal pattern of communication stored in the database.

3. The information controller according to claim 1,
wherein the database defines the pattern of communication by a set of a source address and a destination address of the devices.

4. The information controller according to claim 1, further including a database creation unit configured to automatically create the database.

5. The information controller according to claim 1,
wherein the database stores the mode state of the system, the normal pattern of communication between the devices, and an abnormality treatment method in the mode state of the system to correspond to one another.

6. An information control system of a power plant comprising:
   a plurality of devices configured to communicate with each other;
   a connector configured to connect the devices to each other; and
   an abnormality determination device configured to:
   store a normal pattern of communication between two devices of the plurality of devices for each mode state of the system formed by the plurality of the devices connecting to the network,
   acquire information indicating the mode state of the system to determine the mode state of the system,
   acquire information indicating a pattern of communication between two of the plurality of devices to determine the pattern of communication,
   determine whether or not an abnormality occurs in the system based on the determined pattern of communication and the pattern of communication stored as a normal pattern of communication in the determined mode state of the system, and
   determine that the abnormality occurs in the system in a case where the normal communication in the stored pattern of communication corresponding to the mode state of the system has not been performed entirely within a predetermined time period,
   wherein the two devices include a first controller and a second controller connected to the network, and
   wherein the communication of the acquired information indicating the pattern of communication is one of the first controller notifying the second controller of a state of a turbine of the power plant and a rotation speed of the turbine, and the second controller notifying the first controller of a state of a boiler of the power plant, a temperature of the boiler, and a pressure value of the boiler.

7. The information control system according to claim 6,
wherein the abnormality determination device determines that an abnormality occurs in the system, in a case where at least a portion of the determined pattern of communication does not match the stored normal pattern of communication.

8. The information control system according to claim 6,
wherein the abnormality determination device defines the pattern of communication by a set of a source address and a destination address of the devices.

9. The information control system according to claim 6,
wherein the abnormality determination device stores the mode state of the system, the normal pattern of communication between the devices, and an abnormality treatment method in the mode state of the system to correspond to one another.

10. An information control method of controlling a power plant comprising:
    storing a normal pattern of communication between two devices of a plurality of devices of the power plant for each mode state of a system of the power plant formed by the plurality of devices connected to a network;
    acquiring information indicating the mode state of the system to determine the mode state of the system;
    acquiring information indicating a pattern of communication between two of the plurality of the devices; and
    determining whether or not an abnormality occurs in the system based on the acquired determined pattern of communication and the pattern of communication stored as a normal pattern of communication in the determined mode state of the system, and determining that the abnormality occurs in the system in a case where the normal communication in the stored pattern of communication corresponding to the mode state of the system has not been performed entirely within a predetermined time period,
    wherein the two devices include a first controller and a second controller connected to the network, and
    wherein the communication of the acquired information indicating the pattern of communication is one of the first controller notifying the second controller of a state of a turbine of the power plant and a rotation speed of the turbine, and the second controller notifying the first controller of a state of a boiler of the power plant, a temperature of the boiler, and a pressure value of the boiler.

* * * * *